United States Patent Office 3,116,300
Patented Dec. 31, 1963

3,116,300
PROCESS FOR PREPARING DICYCLO-
ALKYLIDENE DIPEROXIDES
John B. Braunwarth, Crystal Lake, and Gifford W. Crosby, River Forest, Ill., assignors to The Pure Oil Company, Chicago, Ill., a corporation of Ohio
No Drawing. Filed Nov. 18, 1960, Ser. No. 70,114
5 Claims. (Cl. 260—340.6)

This invention relates to the preparation of dicycloalkylidene diperoxides by the reaction of cycloalkanones with hydrogen peroxide in the presence of a haloacid.

The reactions of hydroperoxides are known in the prior art. E. G. E. Hawkins, in his article entilted "Reactions of Organic Peroxides, Part II, Reactions of α,α-Dimethyl Benzyl Hydroperoxide ("Iso-Propylbenzene Hydroperoxide")" (J. Chem. Soc., 1950, 2169), shows the decomposition of α,α-dimethylbenzyl hydroperoxide by ferrous sulfate under the influence of various catalysts, and under the influence of thermal conditions only, to form mixtures of 2-phenylpropan-2-ol, acetophenone, and α-methylstyrene. The hydroperoxides were first shown by Hock and Lang (Ber., 77, 257, 1944), to be formed by the oxidation of isopropylbenzene with air to give Ph.CMe$_2$OOH. Improved methods for their preparation are described by Armstrong, Hall, and Quin, British Patents 610,293 and 630,286 (J. Chem. Soc., 1950, 666). E. G. E. Hawkins and P. P. Young (J. Chem. Soc., 1950, 2804) state that the reaction of methylcyclopentyl hydroperoxide in ferrous sulfate solution gives rise to the formation of dodecane-2,11-dione. However, using methylcyclohexyl hydroperoxide gives poorer yields of tetradecane-2,13-dione. N. Brown et al. (J. Am. Chem. Soc., 77, 1956, (1955)), describe the preparation of "cyclohexanone peroxide" by the autocatalyzed, liquid-phase oxidation of cyclohexanol with oxygen. Reaction of these peroxides in the presence of ferrous ion in hydrocarbon solution is said by Brown et al. to produce a 68% yield of 1,12-dodecanedioic acid.

M. S. Kharasch and W. Nudenberg, in their article entitled, "Detection of Free Radicals in Solution, III, Formation of Long-Chain, α,Ω-Dicarboxylic Acids" (J. Org. Chem., 19, 1921, (1954)), indicate that C$_{20}$ unsaturated dicarboxylic acids are formed from cyclohexanone peroxide, ferrous sulfate and butadiene. The formation of these acids is assumed to take place by rearrangement of an alkoxy radical to an open-chain carbon radical, addition to butadiene, and dimerization of the addition product.

In a copending application, Serial Number 28,211, filed May 11, 1960, there is disclosed a process for the preparation of halogen-substituted aliphatic acids, esters, and ketones involving the reaction of cyclic peroxides in the presence of ferrous ion and a hydrogen halide. The reactions involved are depicted as follows:

(1) 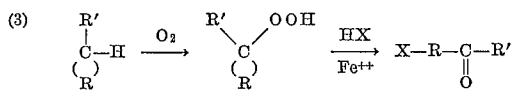

(2) 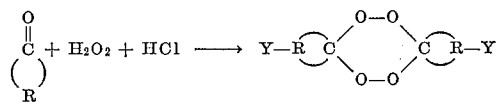

(3) $$\begin{array}{c} R' \\ | \\ C-H \\ (\ ) \\ R \end{array} \xrightarrow{O_2} \begin{array}{c} R' \ \ OOH \\ \diagdown / \\ C \\ (\ ) \\ R \end{array} \xrightarrow[Fe^{++}]{HX} X-R-\underset{\underset{O}{\|}}{C}-R'$$

R in the above equations represents a divalent radical of 3 to 20 carbon atoms containing a chain of 3 to 7 carbon atoms of the methylene, o-phenylene, or mixed methylene and o-phenylene types, and which may contain one or more substituent groups.

In accordance with the instant invention, we have found that a mixture of hydrogen peroxide, cycloalkanone, and hydrochloric acid in the absence of ferrous ion produces a dicycloalkylidene diperoxide. The reaction may be represented as follows:

$$\begin{array}{c} O \\ \| \\ C \\ (\ ) \\ R \end{array} + H_2O_2 + HCl \longrightarrow Y-R \underset{\diagup}{\overset{O-O}{\diagdown}} \underset{O-O}{\overset{\diagup}{\diagdown}} R-Y$$

where R is a divalent radical of 3 to 20 carbon atoms and forming together with the attached carbon atom a ring of 3 to 7 carbon atoms, said ring being formed by a member of the group consisting of methylene, o-phenylene or mixed methylene and o-phenylene groups, and which may contain one or more substituents, designated as Y in the above formula, selected from the group of methyl, ethyl, propyl, butyl, trimethylene, tetramethylene, benzyl, phenyl, cyclohexyl, chloro, fluoro, hydroxy, methoxy, carbozy, or carbalkoxy radicals.

Examples of divalent R groups contained in the primary ring structures in the above equations and definitions include, —(CH$_2$)$_3$—, —(CH$_2$)$_4$—, —(CH$_2$)$_5$—, —(CH$_2$)$_6$—, —(CH$_2$)$_7$—, —CH$_2$CH(CH$_3$)CH$_2$CH$_2$—, —CH$_2$CH$_2$CH$_2$C(CH$_3$)$_2$—,

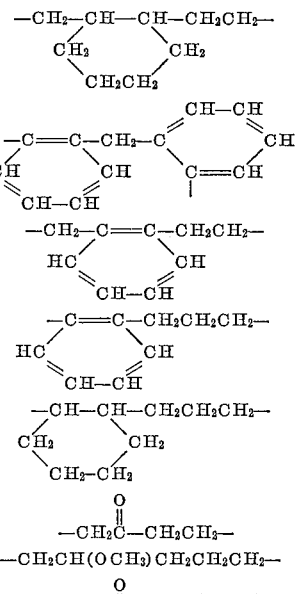

—CH$_2$CH(OH)CH$_2$CH$_2$—, and similar structures.

The following table shows the formulas and names of various products that can be prepared in accordance with this invention:

TABLE I

| R Group | Product Formula | Name |
|---|---|---|
| —(CH$_2$)$_3$— | (bicyclic diperoxide structure with cyclobutylidene rings) | dicyclobutylidene diperoxide. |
| —(CH$_2$)$_4$— | (bicyclic diperoxide structure with cyclopentylidene rings) | dicyclopentylidene diperoxide. |
| —(CH$_2$)$_5$— | (bicyclic diperoxide structure with cyclohexylidene rings) | dicyclohexylidene diperoxide. |
| CH$_3$ \| CH$_2$—CH— \| CH$_2$—CH$_2$— | (bicyclic diperoxide structure with methyl-substituted cyclopentylidene rings) | 2,2'-dimethyldicyclopentylidene diperoxide |
| Cl \| CH$_2$—CH— \| CH$_2$—CH$_2$— | (bicyclic diperoxide structure with chloro-substituted cyclopentylidene rings) | 2,2'-dichlorodicyclopentylidene diperoxide. |
| CH$_3$ CH$_3$ \|    \| CH—CH— \|     \| CH$_2$ CH$_2$— | (bicyclic diperoxide structure with tetramethyl cyclopentylidene rings) | 2,3,2',3'-tetramethyldicyclopentylidene diperoxide. |
| CH$_2$   CH$_2$ \|      \| CH$_2$   CH$_2$ \\    / CH \| OCH$_3$ | (bicyclic diperoxide structure with methoxycyclohexylidene rings) | 4,4'-dimethoxydicyclohexylidene diperoxide. |

In order to further illustrate the invention, the following examples are given.

Example I

A two-liter, 3-necked flask, equipped with mechanical stirrer, was charged with 700 cc. of methanol, 100 cc. of cyclohexanone, and 50 cc. (0.45 mol) of 30% hydrogen peroxide. To this stirred mixture, maintained below 0° C., were slowly added 25 cc. of concentrated sulfuric acid followed by 60 cc. of concentrated hydrochloric acid, over a period of 45 minutes. After the addition had been completed, the mixture was allowed to stand at 20–25° C. for 24 hours, and then was cooled to —20° C. On cooling the stirred mixture, dicyclohexylidene diperoxide separated as a solid, and was collected by filtration. The weight of the crude diperoxide product was 7.3 g., representing a yield of 14.2 mol percent. The product obtained by recrystallization from benzene and methanol melted at 123°–125° C. The melting point reported in the literature is 127°–128° C.

Analysis.—Calculated for C$_{12}$H$_{22}$O$_4$: C, 63.13%; H, 8.83%; mol. wt., 228. Found: C, 63.8%; H, 9.2%; mol. wt., 213.

Using the J. Org. Chem. 23, 1325 (1958), infrared spectrum as a reference spectrum, the recrystallized material was identified as dicyclohexylidene diperoxide.

Example II

Using the technique and apparatus of Example I, 350 cc. of methanol, 50 cc. of 4-methylcyclohexanone, and 25 cc. (0.23 mol) of 30% hydrogen peroxide were mixed with 12.5 cc. of concentrated sulfuric acid and 30 cc. of concentrated hydrochloric acid at —20° C. The mixture was stirred forty-five minutes and then allowed to stand for 24 hours at room temperature. A lower phase was separated, but on cooling no material crystallized from the methanol phase. The lower phase in ether solution was water-washed, and the ether removed by evaporation. A white, solid product was obtained by crystallization from benzene-methanol solution. Its melting point was 103° C.

Analysis.—Calculated for C$_{14}$H$_{26}$O$_4$: C, 65.08; H, 10.15; mol. wt., 258. Found: C, 65.7; H, 10.4; mol. wt., 256.

The weight of the crude dimethylcyclohexylidene diperoxide was 6.7 g., or a mol percent yield of 21.6.

Example III

Using the techniques and apparatus of Example I, 350 cc. of methanol, 40.7 g. of cyclopentanone, and 25 cc. (0.23 mol) of 30% hydrogen peroxide were mixed with 12.5 cc. of concentrated sulfuric acid and 30 cc. of concentrated hydrochloric acid at about —20° C. The mixture was stirred one hour and then allowed to stand for 24 hours at room temperature. A white precipitate began to form almost immediately, and after standing overnight, the solid white product was collected by filtration. Cooling the filtrate failed to yield any more product. Weight of crude product was 4.2 g., or a mol percent yield of 18.2. The melting point of the material after crystallization from methanol-benzene was 155° C. At approximately this same temperature, the material decomposed violently (exploded). Therefore, care in handling should be exercised since the material also detonated when struck.

*Analysis.*—Calculated for $C_{10}H_{16}O_4$: C, 59.98; H, 8.06; mol. wt. 200. Found: C, 59.26; H, 8.53; mol. wt., 235.

*Example IV*

A two-liter, 3-necked flask, equipped with a mechanical stirrer and means for cooling same, is charged with 700 cc. of ethanol, 70 cc. of cyclobutanone, and 50 cc. (0.45 mol) of 30% hydrogen peroxide. The reaction mixture is maintained at a temperature below about 0° C., while 25 cc. of concentrated sulfuric acid, followed by 60 cc. of concentrated hydrochloric acid, are added slowly, with constant stirring. This addition takes place over a period of 1 hour. After the addition of the acids has been completed, the mixture is allowed to stand at 20° to 30° C. for about 48 hours, and then is filtered and cooled to about −25° C. On cooling the stirred mixture, dicyclobutylidene diperoxide is separated as a solid and collected by filtration. The product is identified by analysis and infrared spectroscopy.

The solvents used for the reaction mixture may be methanol, ethanol, pentanol, butanol, ether, carbon disulfide, ethyl acetate, butyl Cellosolve, and the like. The hydrohalic acids, such as HCl, HI, HBr, and HF, are preferably added in concentrated aqueous solutions, i.e., having a concentration ranging from saturated aqueous solutions to about 10% by wt. aqueous solutions. The products are identified by analyses for the elements, their melting points, and infrared spectra.

The higher-molecular-weight diperoxide products are stable at temperatures below 150° C., and as such, are ideally suited as peroxide initiators for reactions well known in the art. The products may be used as addends for gasolines and jet fuels. Any unreacted cycloalkanone peroxide present may be treated with a reducing agent, such as ferrous sulfate or salts of heavy metals capable of existing in several valence states, such as iron, chromium, manganese, cobalt, copper, and molybdenum, or sodium bisulfite, reducing sugars, 1-ascorbic acid, sodium formaldehyde sulfoxylate and other reducing agents known in this art, to form therefrom the omega-haloaliphatic acid, corresponding to the peroxide starting material. Thus, as an example, by treating cyclohexanone with hydrogen peroxide, and a hydrogen halide, there is formed dicyclohexylidene diperoxide. Cyclohexanone peroxide is also formed and can be transformed into omega-halohexanonic acid by reaction, under redox conditions, with a reducing agent in the presence of a mineral acid.

The foregoing examples show the preparation of several diperoxides in accordance with this invention, some of which are shown in Table I. The following table illustrates the range and preferred reaction conditions that may be used in accordance with this invention.

TABLE II

| Reaction Conditions | Range | Preferred |
| --- | --- | --- |
| Addition Temperature, ° C | −50 to 0 | −20 to 0 |
| Pressure, p.s.i.g.-atmospheric | 35 |  |
| Molar Ratio, cyclic ketone to hydrogen peroxide | 1:1 to 10:1 | 2 to 1 |
| Mols sulfuric acid to cyclic ketone | 1:1 to 1:5 | 1 to 2 |
| Mols of hydrohalic acid to cyclic ketone | 1:1 to 1:10 | 1 to 1.4 |
| Reaction Temperature, ° C | −10 to 50 | 20 to 25 |
| Reaction Time, hours | 2 to 50 | 20 to 30 |

The embodiments of the invention, in which an exclusive property or privilege is claimed, are defined as follows:

1. The process for producing dicycloalkylidene diperoxide of the formula

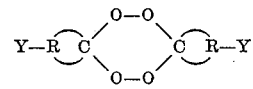

wherein R is a divalent radical of 3 to 20 carbon atoms and forming together with the attached carbon atom a ring of 3 to 7 carbon atoms, said ring being formed by a member of the group consisting of alkylene, o-phenylene and mixed alkylene and o-phenylene groups, and Y is a substituent of the group consisting of hydrogen, methyl, ethyl, propyl, butyl, trimethylene, tetramethylene, benzyl, phenyl, cyclohexyl, chloro, fluoro, hydroxy, methoxy, carboxy, and carbalkoxy which consists in mixing about 2 mols of a cycloalkanone of the formula

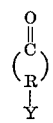

wherein R and Y are as heretofore defined with about a mol of hydrogen peroxide at a temperature of about −20° C. to 0° C. and slowly adding about 1 mol of a concentrated sulfuric acid followed by about 2 mols of concentrated hydrochloric acid while said mixture is maintained at said temperature, allowing the mixture to stand for about 20 to 30 hours at a temperature of about 20° to 25° C., cooling said mixture to about −20° C. and separating said product as a solid.

2. The method in accordance with claim 1 in which said cycloalkanone is cyclohexanone and the product is dicyclohexylidene diperoxide.

3. The method in accordance with claim 1 in which said cycloalkanone is 4-methylcyclohexanone and said product is dimethylcyclohexylidene diperoxide.

4. The method in accordance with claim 1 in which said cycloalkanone is cyclopentanone and said product is dicyclopentylidene diperoxide.

5. The method in accordance with claim 1 in which said cycloalkanone is cyclobutanone and said product is dicyclobutylidene diperoxide.

References Cited in the file of this patent

UNITED STATES PATENTS

| 2,298,405 | Milas | Oct. 13, 1942 |
| 2,591,645 | Walter | Apr. 1, 1952 |